US012596670B1

(12) United States Patent
C et al.

(10) Patent No.: US 12,596,670 B1
(45) Date of Patent: Apr. 7, 2026

(54) ADDRESS LENGTH SELECTION FOR INTER-INTEGRATED CIRCUIT (I2C) COMMUNICATIONS

(71) Applicant: QUALCOMM Incorporated, San Diego, CA (US)

(72) Inventors: Saravana Babu C, Bangalore (IN); Aasaithambi Durairajan, Panruti (IN); Amit Gil, Zichron Yaakov (IL); Sang Tran, Encinitas, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/905,873

(22) Filed: Oct. 3, 2024

(51) Int. Cl.
*G06F 13/42* (2006.01)

(52) U.S. Cl.
CPC .. *G06F 13/4282* (2013.01); *G06F 2213/0016* (2013.01)

(58) Field of Classification Search
None
See application file for complete search history.

(56) References Cited

U.S. PATENT DOCUMENTS

| | | | | |
|---|---|---|---|---|
| 2007/0239966 A1* | 10/2007 | Georgiou | .............. | H04L 49/602 712/28 |
| 2015/0226057 A1* | 8/2015 | Bonavides | ............... | G01V 1/06 340/854.4 |
| 2019/0034374 A1 | 1/2019 | Kim et al. | | |

OTHER PUBLICATIONS

NXP Semiconductors: "I2C-Bus Specification and User Manual", UM10204, Rev. 6, Apr. 4, 2014, 64 Pages.
Georg S, "Scanning I2C addresses", Georg's Log, Sep. 1, 2022, 8 Pages, XP093337758.
International Search Report and Written Opinion PCT/US2025/042188 ISA/EPO Dec. 3, 2025.
Nelson C, "How to Scan and Detect I2C Addresses", Adafruit, Jun. 3, 2024, 16 Pages, XP093337820.

* cited by examiner

*Primary Examiner* — Scott C Sun
(74) *Attorney, Agent, or Firm* — Norton Rose Fulbright US LLP

(57) ABSTRACT

A device includes a processing system configured to receive, via an inter-integrated circuit (I2C) bus, one or more scan acknowledgement messages respectively associated with one or more secondary devices and to send, via the I2C bus, one or more address assignment messages to the one or more secondary devices. The one or more address assignment messages respectively include one or more logical addresses that are associated with the one or more secondary devices. The processing system is further configured to communicate, via the I2C bus, a data message with at least one secondary device of the one or more secondary devices. The data message includes an address field including a logical address indicating that the data message is associated with the at least one secondary device. A length of the address field is based on a quantity of the one or more scan acknowledgement messages.

20 Claims, 4 Drawing Sheets

400 ⟶

500

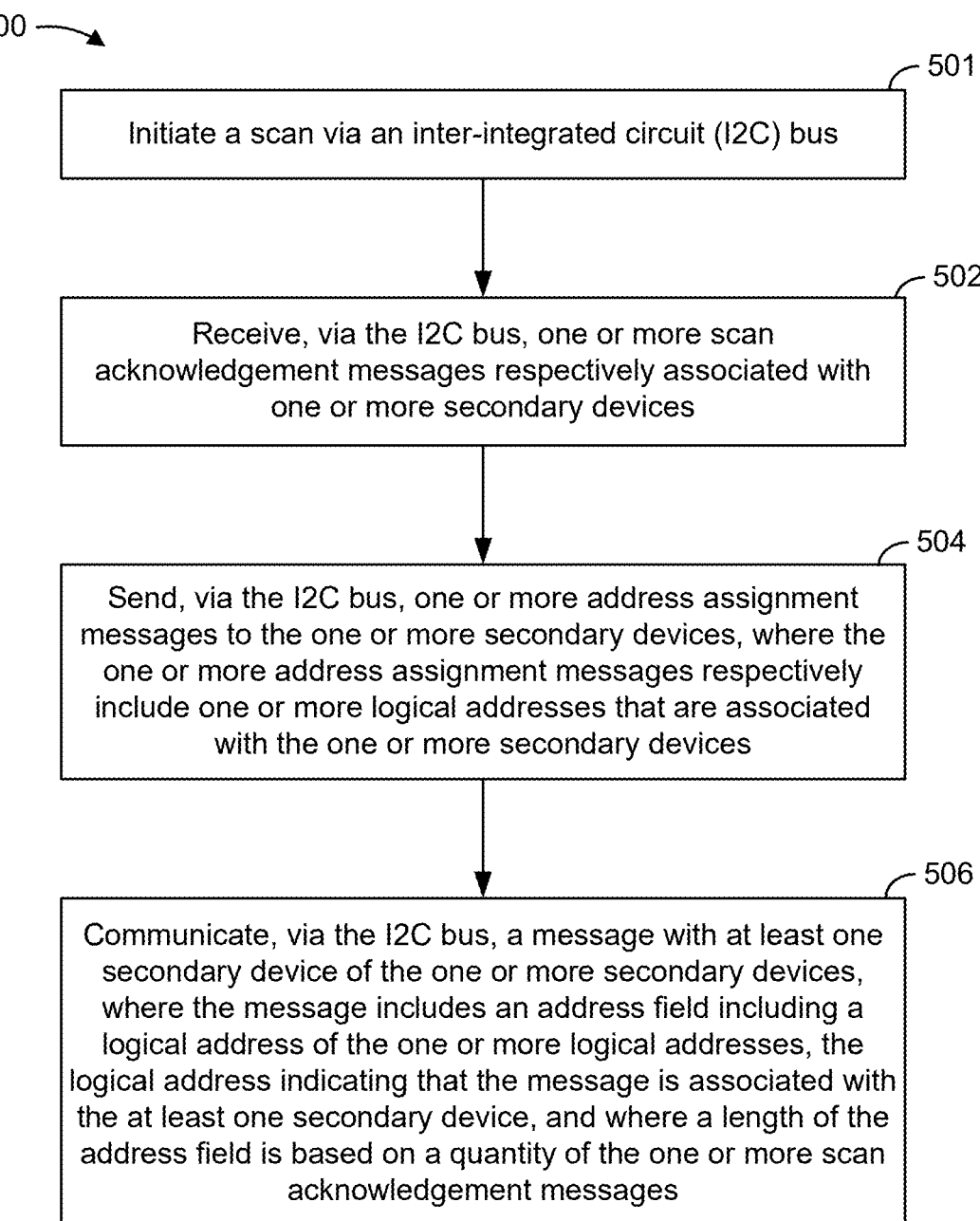

501

Initiate a scan via an inter-integrated circuit (I2C) bus

502

Receive, via the I2C bus, one or more scan acknowledgement messages respectively associated with one or more secondary devices

504

Send, via the I2C bus, one or more address assignment messages to the one or more secondary devices, where the one or more address assignment messages respectively include one or more logical addresses that are associated with the one or more secondary devices

506

Communicate, via the I2C bus, a message with at least one secondary device of the one or more secondary devices, where the message includes an address field including a logical address of the one or more logical addresses, the logical address indicating that the message is associated with the at least one secondary device, and where a length of the address field is based on a quantity of the one or more scan acknowledgement messages

*FIG. 5*

ADDRESS LENGTH SELECTION FOR INTER-INTEGRATED CIRCUIT (I2C) COMMUNICATIONS

TECHNICAL FIELD

Aspects of the present disclosure relate generally to electronic devices and systems, and more particularly, to electronic devices and systems that use inter-integrated circuit (I2C) communications.

DESCRIPTION OF THE RELATED TECHNOLOGY

Computer information systems may include components such as expansion circuit boards (such as mother and daughter cards), integrated circuit (IC) devices, and/or system-on-chip (SoC) devices. The components may include processing circuits, user interface components, storage components, and/or other peripheral components. Communication between components may be implemented using a bus. The bus may be operated in compliance with standards-defined specifications and protocols. One example of such an interface is the inter-integrated circuit (I2C) interface. An I2C interface may provide a shared serial bus architecture that supports interconnection of multiple devices.

The value and use of information by individuals continues to increase, as do computational requirements. Computational processes performed by computer information systems may use buses to transmit signaling to enable performance of various tasks. The tasks may include, for example, processing, compiling, storing, and communicating information. Technology and information handling techniques may vary between different users and different applications and different computer information systems, so that there may be differences in how information is handled, processed, stored, or communicated. The variations in information handling may enable computer information systems to perform various operations, such as financial transaction processing, airline reservations, enterprise data storage, or global communications. As a result, the buses that interconnect components of computer information systems components may support a wide variety of information and tasks associated with the information.

In some cases, the buses the interconnect these components may limit the performance of a computer information system, such as if the throughput of a bus limits the amount or type of information that is communicated between components. As a result, performance may be decreased.

SUMMARY

The systems, methods and devices of this disclosure each have several innovative aspects, no single one of which is solely responsible for the desirable attributes disclosed herein.

In some aspects, a device includes a processing system including one or more processors and one or more memories coupled to the one or more processors. The processing system is configured to receive, via an inter-integrated circuit (I2C) bus, one or more scan acknowledgement messages respectively associated with one or more secondary devices and to send, via the I2C bus, one or more address assignment messages to the one or more secondary devices. The one or more address assignment messages respectively include one or more logical addresses that are associated with the one or more secondary devices. The processing system is further configured to communicate, via the I2C bus, a data message with at least one secondary device of the one or more secondary devices. The data message includes an address field including a logical address of the one or more logical addresses, and the logical address indicates that the data message is associated with the at least one secondary device. A length of the address field is based on a quantity of the one or more scan acknowledgement messages.

In some further aspects, a method of operation of a device includes receiving, via an I2C bus, one or more scan acknowledgement messages respectively associated with one or more secondary devices and sending, via the I2C bus, one or more address assignment messages to the one or more secondary devices. The one or more address assignment messages respectively include one or more logical addresses that are associated with the one or more secondary devices. The method further includes communicating, via the I2C bus, a data message with at least one secondary device of the one or more secondary devices. The data message includes an address field including a logical address of the one or more logical addresses, and the logical address indicates that the data message is associated with the at least one secondary device. A length of the address field is based on a quantity of the one or more scan acknowledgement messages.

In some additional aspects, a non-transitory computer-readable medium stores instructions executable by one or more processors of a device to initiate, control, or perform operations. The operations include receiving, via an I2C bus, one or more scan acknowledgement messages respectively associated with one or more secondary devices and sending, via the I2C bus, one or more address assignment messages to the one or more secondary devices. The one or more address assignment messages respectively include one or more logical addresses that are associated with the one or more secondary devices. The operations further include communicating, via the I2C bus, a data message with at least one secondary device of the one or more secondary devices. The data message includes an address field including a logical address of the one or more logical addresses, and the logical address indicates that the data message is associated with the at least one secondary device. A length of the address field is based on a quantity of the one or more scan acknowledgement messages.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIG. 5 is a flow chart of an example of a method that supports address length selection for I2C communications.

Like reference numbers and designations in the various drawings indicate like elements.

DETAILED DESCRIPTION

Integrated circuit (I2C) buses may be utilized in a variety of systems and devices. Some systems and devices may use an I2C bus to communicate control information, such as status information indicating the states of components. In some systems and devices, I2C buses may be increasingly used to transmit data among components (alternatively or in addition to control information). As an illustrative example, as sensors are increasingly used to measure and transmit data, systems may increasingly use I2C buses to communicate the data from the sensors to a primary device. In some conventional systems, the amount of transferred data may exceed a bandwidth associated with an I2C bus. As a result, the I2C bus may become a "bottleneck" of a system, which may reduce system throughput and performance.

In some aspects of the disclosure, a primary device may perform a scan to determine a quantity of secondary devices that are coupled to the primary device via an I2C bus. Based on the quantity, the primary device may set a length of an address field that is used in one or more messages communicated via the I2C bus. As an illustrative example, based on detecting that the quantity is one or two, the primary device may use a single bit for the address field. In such examples, the length of the address field may correspond to one bit.

To further illustrate, the quantity of secondary devices may be indicated as n, where n is a positive integer greater than zero. The primary device may set the length of the address field to one bit if n=1. In some other examples, if n>1, the primary device may set the length of the address field to $\lceil \log 2(n) \rceil$ bits, where $\log 2(n)$ indicates a base-two logarithm of n, and where $\lceil \ \rceil$ indicates the ceiling function.

By setting the length of the address field based on the quantity of secondary devices, the length of the address field may be reduced in at least some scenarios as compared to other techniques, such as techniques that "default" the length to seven bits or ten bits. As a result, overhead associated with communications sent via the I2C bus may be reduced.

Further, because the amount of data included in an I2C data packet may be relatively small, large amounts of data may accrue significant overhead due to the address field. For example, if an I2C data packet includes eight data bits, then transferring a large amount of data via an I2C bus may involve breaking the data into a large amount of data packets, each of which may include an address field. Accordingly, by reducing the length of an address field, overhead may be reduced for each data packet of a plurality of data packets, which may be significant when the quantity of data packets is large.

Figure 1:
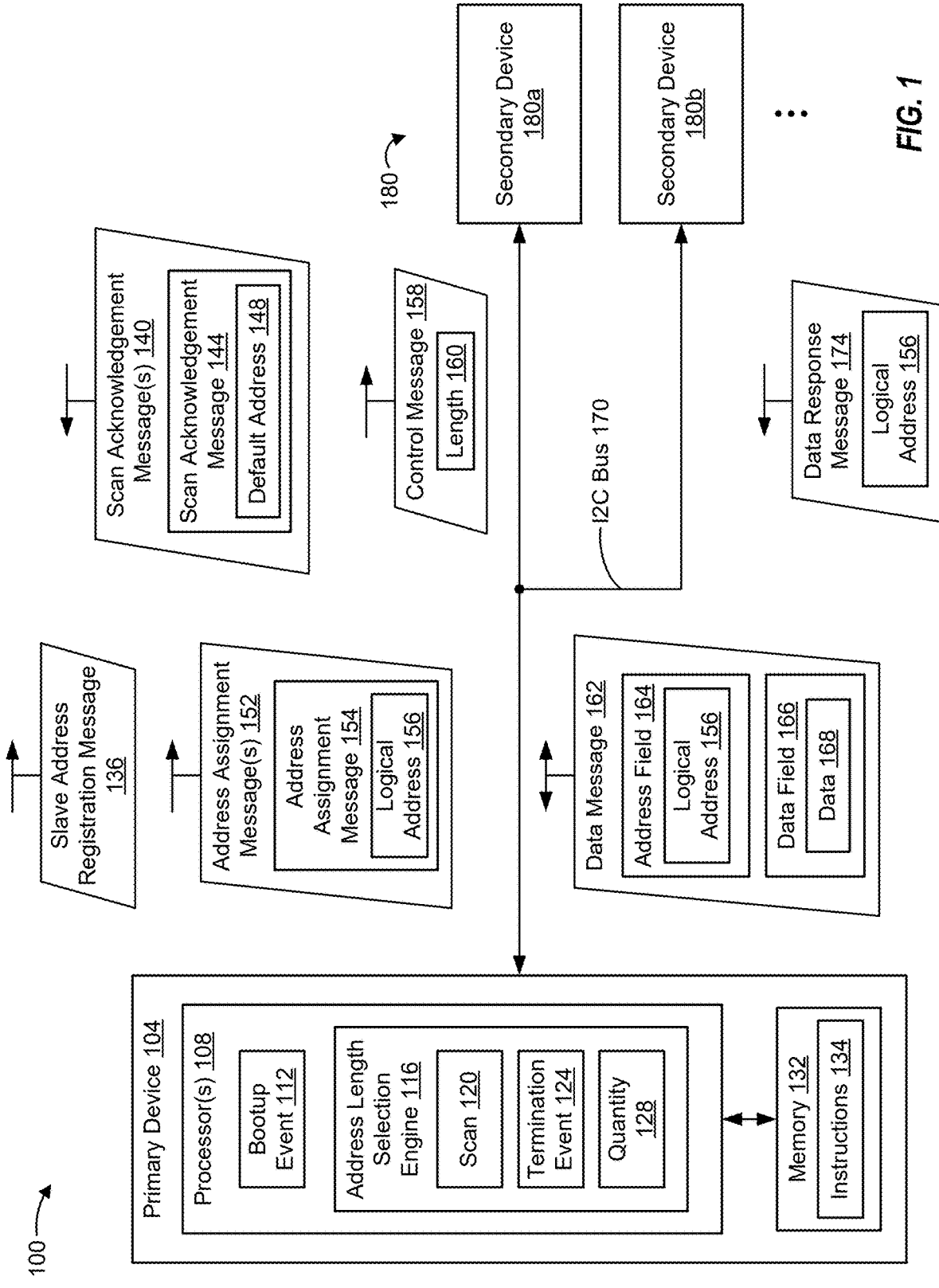
FIG. 1 illustrates an example of a system that supports address length selection for inter-integrated circuit (I2C) communications.

FIG. 1 illustrates an example of a system 100 that supports address length selection for I2C communications. The system 100 includes at least one device, such as a primary device 104, and one or more secondary devices 180. In some examples, the one or more secondary devices 180 may include a secondary device 180a and a secondary device 180b.

The primary device 104 is coupled to the one or more secondary devices 180 via an I2C bus 170. In some implementations, the I2C bus 170 may include multiple connections (or "lines"), such as a data line and a clock line. An example of a data line is a serial data line (SDA), and an example of a control line is a serial clock line (SCL). As referred to herein, an I2C bus may refer to a bus, interface, or other connection that is operated, or that is configured to operate, using an I2C protocol.

In some examples, one or more devices described with reference to FIG. 1 may include one or more processors and one or more memories. For example, the primary device 104 may include one or more processors 108 and a memory 132. The one or more processors 108 may be coupled to the memory 132. In some examples, the one or more processors 108 may include or may execute an address length selection engine 116 to initiate, perform, or control one or more operations described herein. Alternatively, or in addition, a memory (such as the memory 132) may store instructions (such as instructions 134) executable to initiate, perform, or control one or more operations described herein.

In some examples, the primary device 104 may correspond to a controller or a processing system. For example, the primary device 104 may correspond to a microcontroller, a central processing unit (CPU), a digital signal processor (DSP), a graphics processor unit (GPU), or another device. In some examples, the one or more secondary devices may correspond to memory devices, such as volatile memories or non-volatile memories. In some other examples, the secondary devices 180 may include sensor devices, such as Internet-of-Things (IoT) sensor devices or display devices, as illustrative examples. Further, in some examples, the primary device 104 may include or at least a first integrated circuit (such as a system-on-chip (SoC) device), and the one or more secondary devices 180 may include at least a second circuit that is coupled to the first circuit via the I2C bus 170. In some examples, the primary device 104 may be referred to as a master device, and the one or more secondary devices 180 may each be referred to as a slave device.

During operation, the primary device 104 performs a scan 120 to detect the one or more secondary devices 180. In some examples, the primary device 104 performs the scan 120 based on a bootup event 112 associated with the primary device 104 (or a device that includes the primary device 104). In some examples, the scan 120 includes or is referred to as an address arbitration procedure. In some examples, the bootup event 112 is detected or is performed based on a power-on reset (POR) signal generated by a POR circuit of the primary device 104.

In some examples, the scan 120 includes broadcasting, via the I2C bus 170, a slave address registration message 136. In some examples, the one or more secondary devices 180 receive the slave address registration message 136 via the I2C bus 170. In some examples, the slave address registration message 136 indicates that a device receiving the slave address registration message 136 is to reply to the slave address registration message 136 via the I2C bus 170 with a particular message, such as an acknowledgement (ACK) message.

In accordance with receiving the slave address registration message 136, the one or more secondary devices 180 may transmit, via the I2C bus 170, one or more scan acknowledgement messages 140. The one or more scan acknowledgement messages 140 may be respectively associated with one or more secondary devices 180. For example, the one or more scan acknowledgement messages 140 may include a scan acknowledgement message 144 associated with the secondary device 180a. The scan acknowledgement message 144 may include a default address 148 associated with the secondary device 180a. To further illustrate, the one or more scan acknowledgement messages 140 may further include another scan acknowledgement message that is associated with the secondary device 180b and that indicates a default address associated with the secondary device 180b. The primary device 104 may receive the one or more scan acknowledgement messages 140 via the I2C bus 170. Performing the scan 120 may include receiving the one or more scan acknowledgement messages 140 via the I2C bus 170.

The primary device 104 may send, via the I2C bus 170, one or more address assignment messages 152 respectively associated with the one or more secondary devices 180. The primary device 104 may send the one or more address assignment messages 152 after the scan 120 and based on the one or more scan acknowledgement messages 140. The one or more address assignment messages 152 may include logical addresses respectively associated with the secondary devices 180.

To illustrate, for each scan acknowledgement message 140 received from a secondary device 180, the primary device 104 may transmit an address assignment message 152 indicating a logical address associated with the secondary device 180. As an example, based on receiving the scan acknowledgement message 144 indicating the default address 148, the primary device 104 may send, to the secondary device 180a, an address assignment message 154 of the one or more address assignment messages 152. The address assignment message 154 may indicate a logical address 156 associated with the secondary device 180a. To further illustrate, the one or more address assignment messages 152 may further include another address assignment message that is associated with the secondary device 180b and that indicates a logical address associated with the secondary device 180b.

After the scan 120, the address length selection engine 116 may assign logical addresses to the one or more secondary devices 180 in an order of ascending length (e.g., by increasing the length of the logical addresses as more logical addresses are assigned). To illustrate, the address length selection engine 116 may initially assign logical addresses of one bit (e.g., a logical address of "0" and a logical address of "1"). After assigning logical addresses of one bit, the address length selection engine 116 may assign logical addresses of two bits (e.g., a logical address of "10" and a logical address of "11"). After assigning logical addresses of two bits, the address length selection engine 116 may assign logical addresses of three bits (e.g., a logical addresses of "100," "101," "110" and "111"). In such examples, the address length selection engine 116 may increase the length of logical addresses indicated by one or more the address assignment messages 152 from one bit, to two bits, to three bits after the scan 120.

In some examples, the primary device 104 may continue the scan 120 until detecting a termination event 124 associated with the scan. In some examples, based on detecting the termination event 124, the primary device 104 terminates the scan 120. Further, in some examples, after detecting the termination event 124, the primary device 104 continues monitoring for scan acknowledgement messages 140 and sending address assignment messages 152 assigning logical addresses in response to any additional such scan acknowledgement messages 140.

To further illustrate, in some implementations, detecting the termination event 124 may include detecting expiration of a threshold time interval since initiating the scan 120. In some implementations, the address length selection engine 116 may include a counter (e.g., a hardware counter or a software counter) that indicates a value. Based on initiation of the scan 120, the address length selection engine 116 may set the value of the counter to an initial value. During the scan 120, the address length selection engine 116 may adjust (e.g., increment or decrement) the value of the counter. In some such examples, detecting the termination event 124 may include determining that the value of the counter exceeds a threshold value. Other examples are also within the scope of the disclosure.

Further, based on detecting the termination event 124, the primary device 104 may set (or "finalize") a length 160 of an address field 164. The length 160 may correspond to a quantity 128 of the one or more scan acknowledgement messages 140 received by the primary device 104 (or a quantity of the one or more secondary devices 180). To illustrate, Table 1 indicates some example values of the length 160 of the address field 164 for different values of the quantity 128. In some examples, the primary device 104 may set the length 160 of the address field in accordance with Table 1.

TABLE 1

| Quantity of Scan Acknowledgement Messages | Length of Address Field | Logical Addresses |
|---|---|---|
| 1 or 2 | 1 bit | 0 and 1 |
| 3 or 4 | 2 bits | 00, 01, 10, and 11 |
| 5, 6, 7, or 8 | 3 bits | 000, 001, 010, 011, 100, 101, 110, and 111 |
| 9, 10, 11, 12, 13, 14, 15, or 16 | 4 bits | 0000, 0001, 0010, 0011, 0100, 0101, 0110, 0111, 1000, 1001, 1010, 1011, 1100, 1101, 1110, and 1111 |
| . . . | . . . | . . . |
| n | 1 bit if n = 1; else $[\log_2(n)]$ bits. | |

In the example of Table 1, the quantity 128 of the one or more scan acknowledgement messages 140 (and the quantity of the one or more secondary devices 180) may correspond to n, where n indicates a positive integer greater than zero. Further, the length 160 of the address field 164 may correspond to 1 bit if n=1 and may otherwise correspond to ⌈log 2(n)⌉ bits, where log 2(n) indicates a base-two logarithm of n, and where ⌈ ⌉ indicates the ceiling function.

Based on detecting the termination event 124, the primary device 104 may broadcast, via the I2C bus 170 and to the one or more secondary devices 180, a control message 158 indicating the length 160. The one or more secondary devices 180 may receive the control message 158. In some examples, the one or more secondary devices 180 may store an indication of the length 160 to a particular location. In some examples, the particular location may correspond to an I2C address length indication register.

After sending the control message 158, the primary device 104 may communicate with at least one of the one or more secondary devices 180. For example, the primary device 104 may communicate, via the I2C bus 170, a data message 162 with the secondary device 180*a*. In some examples, communicating the data message 162 may include sending the data message 162 to the secondary device 180*a*. In some other examples, communicating the data message 162 may include receiving the data message 162 from the secondary device 180*a*.

The data message 162 may include the address field 164, and the address field 164 may indicate the logical address 156 associated with the secondary device 180*a*. In some examples, the data message 162 may further include a data field 166. The data field 166 may include data, such as data 168. In some such examples, the data message 162 may correspond to a write command and may include an instruction to write the data 168 to a memory of the secondary device 180*a*.

In some other examples, the data message 162 may correspond to another message. For example, the data message 162 may correspond to a read command and may include an instruction to read the data 168 from a memory of the secondary device 180*a*. In some such examples, the secondary device 180*a* may provide the data 168 to the primary device 104 via a data response message 174. The secondary device 180*a* may send the data response message 174 to the primary device 104 via the I2C bus 170. In some examples, the data response message 174 may include an address field containing the logical address 156. The address field may have a length corresponding to the length 160.

In some implementations, the primary device 104 may repeat the scan 120. For example, after performing the scan 120 based on the bootup event 112, the primary device 104 may repeat the scan 120 during operation of the system 100 to receive one or more second scan acknowledgement messages. The primary device 104 may adjust the length 160 of the address field 164 based on a second quantity of the one or more second scan acknowledgement messages. For example, in some circumstances, a secondary device may be added to the system 100, may be removed from the system 100, may enter a sleep mode of operation, or may enter an active mode of operation, in which case the second quantity may differ from the quantity 128.

In some aspects, a default address (such as the default address 148) of a secondary device may be associated with a first format that is different than a second format associated with a logical address (such as the logical address 156) of the secondary device. To illustrate, in some examples, the default address 148 may have a particular length that is greater than the length of the logical address 156. Further, in some examples, the default address 148 may be referred to as a temporary address, and the logical address 156 may be referred to as a static address. Other examples are also within the scope of the disclosure.

Figures 2, 3:
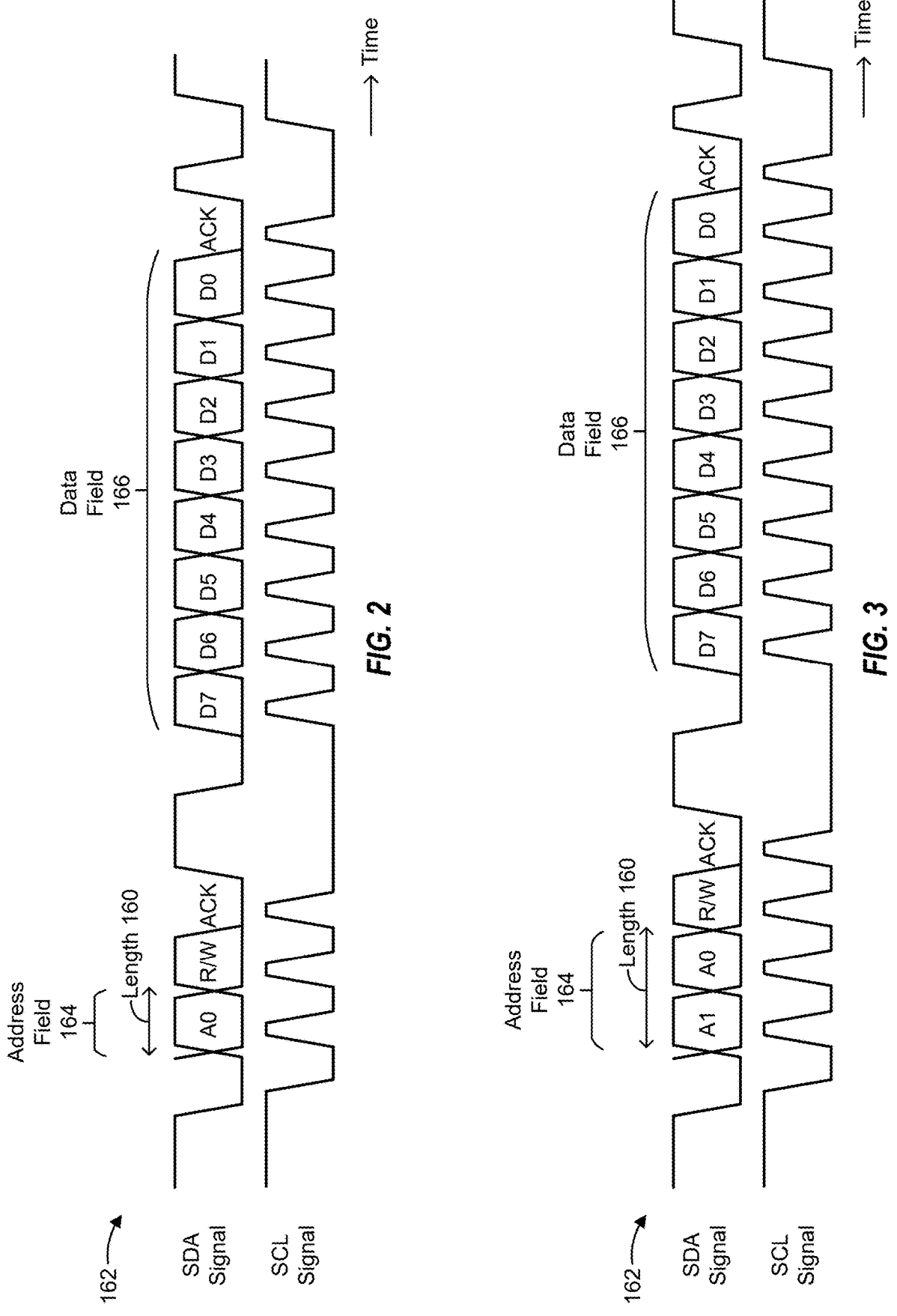
FIG. 2 illustrates an example of a data message with a one bit address field for I2C communications.
FIG. 3 illustrates another example of a data message with a two bit address field for I2C communications.

FIG. 2 illustrates an example of a data message 162 that supports address length selection for I2C communications. The data message 162 may be associated with a serial data line (SDA) signal and a serial clock line (SCL) signal. The data message 162 may include the address field 164 and the data field 166. The address field 164 may include the logical address 156 of FIG. 1 (e.g., bit A0), and the data field 166 may include the data 168 (e.g., the bits D0, D1, D2, D3, D4, D5, D6, and D7).

In some examples, the primary device 104 of FIG. 1 may initiate the data message 162 by transitioning the SDA signal from a logic one value (or a "high" value) to a logic zero value (or a "low" value) and then transitioning the SCL signal from a logic one value to a logic zero value. Such a sequence of values of the SDA signal and the SCL signal may indicate to the one or more secondary devices 180 that the data message 162 is to be sent via the I2C bus 170. After detecting that the data message 162 is to be sent, each secondary device 180 may monitor the address field 164 to determine whether the data message 162 is addressed to the secondary device 180.

In the example of FIG. 2, the address field 164 may include one bit (bit A0). A value of the bit A0 may be selected to indicate logical addresses associated with the one or more secondary devices 180. To illustrate, in one example, the bit A0 may be set to a logic zero value to indicate the secondary device 180*a* and may be set to a logic one value to indicate the secondary device 180*b*. Further, in the example of FIG. 2, the length 160 may correspond to one bit. In such examples, n=1, and the quantity 128 of the one or more secondary devices 180 may correspond to one or two.

After the address field 164, and SDA signal may include a read-or-write (R/W) indication. In some examples, an acknowledgement (ACK) may follow the R/W indication. After the ACK, the primary device 104 may send the data 168 (e.g., the bits DO-D7). Accordingly, in the example of FIG. 2, the R/W indication may specify a write operation, such as where the R/W corresponds to a logic zero bit. In some other examples, the R/W indication may specify a read operation (e.g., where the R/W indication corresponds to a logic one bit), and the secondary device may provide the data 168 to the primary device 104 (e.g., via the data response message 174 of FIG. 1). In some examples, an ACK may follow the data field 166.

In some examples, the primary device 104 of FIG. 1 may terminate the data message 162 by transitioning the SCL signal from a logic zero value (or a "low" value) to a logic one value (or a "high" value) and then transitioning the SDA signal from a logic zero value to a logic one value. Such a sequence of values of the SDA signal and the SCL signal may indicate to the one or more secondary devices 180 that transmission of the data message 162 is complete.

FIG. 3 illustrates another example of a data message 162 that supports address length selection for I2C communications. In the example of FIG. 3, the address field 164 may include two bits (bits A0 and A1). Values of the two bits may be selected to indicate logical addresses of the one or more secondary devices 180. Further, in the example of FIG. 3, the length 160 may correspond to two bits. In such examples, n=2, and the quantity 128 of the one or more secondary devices 180 may correspond to three or four.

Figure 4:
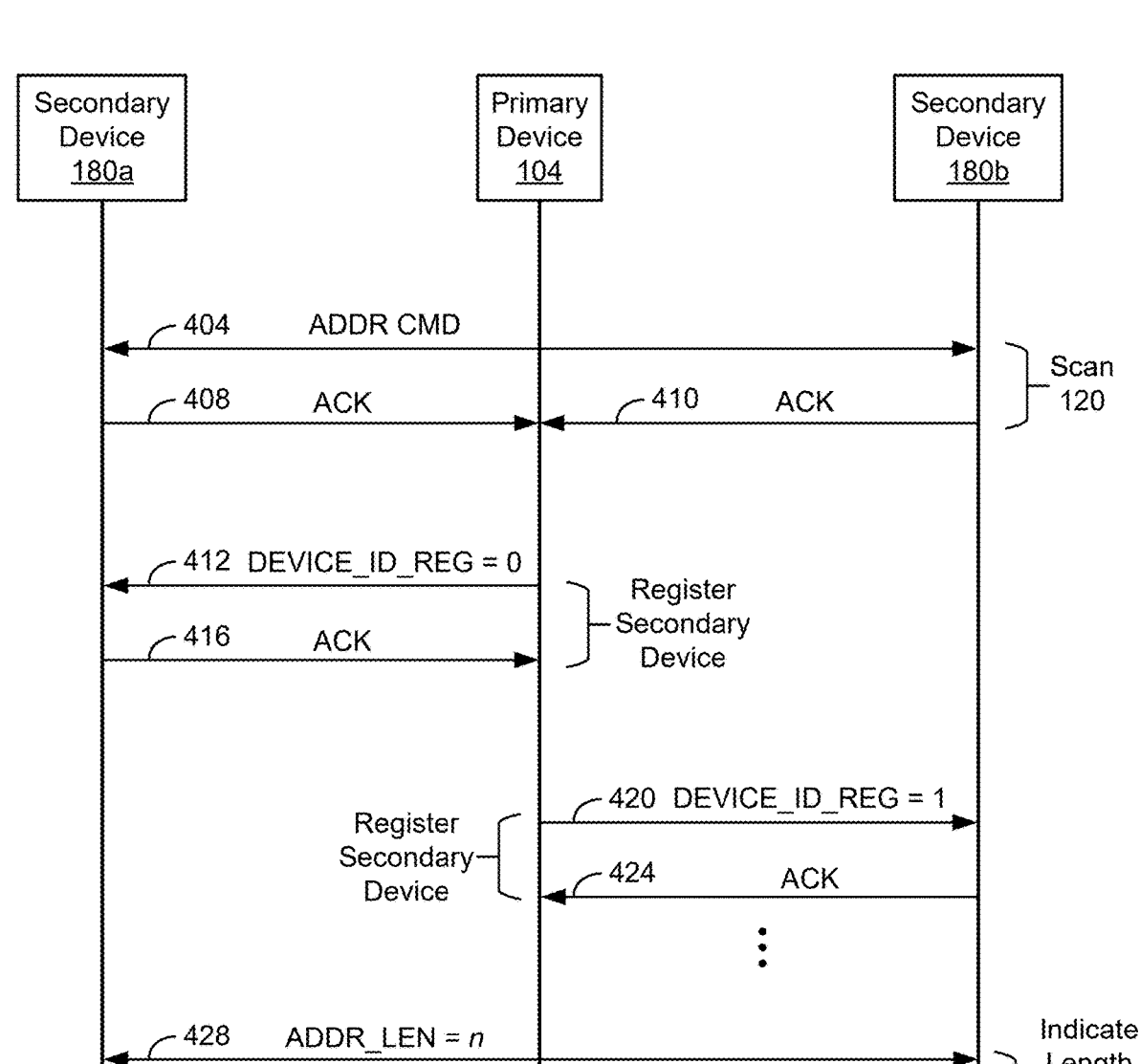
FIG. 4 illustrates operations that support address length configuration for I2C communications.

FIG. 4 illustrates operations 400 that support address length selection for I2C communications. In some examples, the operations 400 may be performed by the system 100 of FIG. 1. For example, the operations 400 may be performed by the primary device 104, the secondary device 180*a*, and the secondary device 180*b*. Further, the operations 400 may be performed using the I2C bus 170 of FIG. 1.

The operations 400 may include performing the scan 120. For example, the primary device 104 may broadcast a slave address registration message, at 404, such as the slave address registration message 136 of FIG. 1. One or more secondary devices may receive the slave address registration message. For example, the secondary device 180*a* and the secondary device 180*b* may receive the slave address registration message using the I2C bus 170.

The secondary devices 180*a-b* may transmit ACKs based on the slave address registration message. For example, the secondary device 180*a* may send an ACK to the primary device 104, at 408, and the secondary device 180*b* may send another ACK to the primary device 104, at 410. The primary device 104 may receive the ACKs. The ACKs may correspond to the address assignment messages 152 of FIG. 1.

The operations 400 may further include registering the secondary device 180*a* based on the ACK received from the secondary device 180*a*. For example, the primary device 104 may indicate a device identifier (ID) (e.g., a logical address) associated with the secondary device 180*a*, at 412. In some examples, the device ID may correspond to the logical address 156. In an illustrative example, the device ID may correspond to a logic zero value. The secondary device 180*a* may transmit an ACK in response to receiving the device ID, at 416.

The operations 400 may further include registering the secondary device 180*b* based on the ACK received from the secondary device 180*a*. For example, the primary device 104 may indicate a device ID (e.g., a logical address) associated with the secondary device 180*a*, at 420. In an illustrative example, the device ID may correspond to a value of one. The secondary device 180*b* may transmit an ACK in response to receiving the device ID, at 424.

The operations 400 may further include setting a length of an address field, such as by setting the length 160 of the address field 164 of FIG. 1. For example, the primary device 104 may indicate the length of the address field to the secondary devices 180*a-b*, such as by broadcasting the control message 158, at 428. In the example of FIG. 4, the primary device 104 may receive two address assignment messages 152 (e.g., the ACKs received from the secondary devices 180*a-b* at 408 and at 410). In such examples, the primary device 104 may set n=2 and may determine the quantity 128 as $\lceil \log 2(n) \rceil = 1$ bit. Other examples are also within the scope of the disclosure.

Based on the indication of the length of the address field, the secondary devices 180*a-b* may transmit acknowledgements of the indication of the length of the address field. For example, the secondary device 180*a* may transmit an ACK, at 442, and the secondary device 180*b* may transmit an ACK, at 444.

To further illustrate some aspects of the disclosure, in an example, a platform design may include a particular quantity of slave devices connected to a master device via an I2C bus. On POR, both the master device and the slave devices may be configured with default addresses, such as seven-bit addresses or ten-bit addresses. The master device may identify the particular quantity by scanning the I2C bus. The master device may assign a respective device ID to each slave device using a range of static addresses from zero to 2^k (where k is a positive integer indicating a quantity of address bits). After the slave devices are configured with such static addresses, the master device may broadcast a message to inform the slaves that further data transfers are to use a k-bit address field. Such a procedure may be performed once during boot-up. Alternatively, or in addition, the procedure may be performed during runtime to reconfigure the address length.

By setting the length 160 of the address field 164 based on the quantity 128, the length 160 of the address field 164 may be reduced in at least some scenarios as compared to other techniques, such as techniques that "default" an address field length to seven bits or ten bits. As a result, overhead associated with communications sent via the I2C bus 170 may be reduced.

Further, because the amount of data included in an I2C data packet may be relatively small, large amounts of data may accrue significant overhead due to an address field. For example, if an I2C data packet includes eight data bits (e.g., as shown in FIGS. 2 and 3), then transferring a large amount of data 168 via the I2C bus 170 may involve breaking the data 168 into a large amount of data packets, each of which may include an address field 164. Accordingly, by reducing the length 160 of the address field 164, overhead may be reduced for each data packet of a plurality of data packets, which may be significant when the quantity of data packets is large.

FIG. 5 is a flow chart of an example of a method 500 that supports address length selection for I2C communications. In some examples, the method 500 may be performed by a device, such as primary device 104.

The method 500 may include initiating a scan via an I2C bus, at 501. For example, the primary device 104 may initiate the scan 120 via the I2C bus 170, such as by broadcasting the slave address registration message 136.

The method 500 further includes receiving, via the I2C bus, one or more scan acknowledgement messages respectively associated with one or more secondary devices, at 502. For example, the primary device 104 may receive, via the I2C bus 170, the one or more scan acknowledgement messages 140 from the one or more secondary devices 180.

The method 500 further includes sending, via the I2C bus, one or more address assignment messages to the one or more secondary devices, at 504. The one or more address assignment messages respectively include one or more logical addresses that are associated with the one or more secondary devices. For example, the primary device 104 may send, via the I2C bus 170, the one or more address assignment messages 152 to the one or more secondary devices 180. The one or more address assignment messages 152 may respectively include one or more logical addresses that are associated with the one or more secondary devices 180. For example, the one or more address assignment messages 152 may include the address assignment message 154 including the logical address 156 associated with the secondary device 180*a*.

The method 500 further includes communicating, via the I2C bus, a data message with at least one secondary device of the one or more secondary devices, at 506. The data message includes an address field including a logical address of the one or more logical addresses, and the logical address indicates that the data message is associated with the at least one secondary device. A length of the address field is based on a quantity of the one or more scan acknowledgement messages. In some examples, the data message may correspond to the data message 162. For example, the primary device 104 may send, or may receive, the data message 162 with at least one secondary device of the one or more secondary devices 180. The data message 162 may include the address field 164 including the logical address 156 of the at least one secondary device. The length 160 of the address field 164 may be based on the quantity 128 of the one or more scan acknowledgement messages 140. In some other examples, the data message may correspond to the data response message 174.

In some examples, a device (such as the primary device 104) may include a processing system including one or more processors (such as the one or more processors 108) and one or more memories (such as the memory 132) coupled to the one or more processors. The processing system may be configured to operate in accordance with the method 500 of FIG. 5. Alternatively, or in addition, a computer-readable medium (such as the memory 132) may store instructions (such as the instructions 134) executable by one or more processors (such as the one or more processors 108) of a device (such as the primary device 104) to initiate, perform, or control one or more operations described herein, such as one or more operations of the method 500 of FIG. 5.

In a first aspect, a device includes a processing system including one or more processors and one or more memories coupled to the one or more processors. The processing system is configured to receive, via an inter-integrated circuit (I2C) bus, one or more scan acknowledgement messages respectively associated with one or more secondary devices and to send, via the I2C bus, one or more address assignment messages to the one or more secondary devices. The one or more address assignment messages respectively include one or more logical addresses that are associated with the one or more secondary devices. The processing system is further configured to communicate, via the I2C bus, a data message with at least one secondary device of the one or more secondary devices. The data message includes an address field including a logical address of the one or more logical addresses, and the logical address indicates that the data message is associated with the at least one secondary device. A length of the address field is based on a quantity of the one or more scan acknowledgement messages.

In a second aspect, in combination with the first aspect, the processing system is further configured to perform a scan for the one or more secondary devices. The scan includes a broadcast, via the I2C bus, of a slave address registration message, and the one or more scan acknowledgement messages are received based on the slave address registration message.

In a third aspect, in combination with one or more of the first aspect or the second aspect, the processing system is further configured to terminate the scan based on detecting a termination event and, based on the termination event, broadcast, via the I2C bus, a control message indicating the length of the address field to the one or more secondary devices.

In a fourth aspect, in combination with one or more of the first aspect through the third aspect, the scan is performed based on a bootup event associated with the device.

In a fifth aspect, in combination with one or more of the first aspect through the fourth aspect, the processing system is further configured to repeat, after the scan, the scan during operation of the device to receive one or more second scan acknowledgement messages and to adjust the length of the address field based on a second quantity of the one or more second scan acknowledgement messages.

In a sixth aspect, in combination with one or more of the first aspect through the fifth aspect, the one or more scan acknowledgement messages include a scan acknowledgement message associated with the at least one secondary device, and the scan acknowledgement message includes a default address associated with the at least one secondary device. The default address is distinct from the logical address.

In a seventh aspect, in combination with one or more of the first aspect through the sixth aspect, the default address is associated with a first format, and the logical address is associated with a second format that is different than the first format.

In an eighth aspect, a method of operation of a device includes receiving, via an inter-integrated circuit (I2C) bus, one or more scan acknowledgement messages respectively associated with one or more secondary devices and sending, via the I2C bus, one or more address assignment messages to the one or more secondary devices. The one or more address assignment messages respectively include one or more logical addresses that are associated with the one or more secondary devices. The method further includes communicating, via the I2C bus, a data message with at least one secondary device of the one or more secondary devices. The data message includes an address field including a logical address of the one or more logical addresses, and the logical address indicates that the data message is associated with the at least one secondary device. A length of the address field is based on a quantity of the one or more scan acknowledgement messages.

In a ninth aspect, in combination with the eighth aspect, the method further includes performing a scan for the one or more secondary devices. Performing the scan includes broadcasting, via the I2C bus, a slave address registration message. The one or more scan acknowledgement messages are received based on the slave address registration message.

In a tenth aspect, in combination with one or more of the eighth aspect through the ninth aspect, the method further includes terminating the scan based on detecting a termination event and broadcasting, based on detecting the termination event and via the I2C bus, a control message indicating the length of the address field to the one or more secondary devices.

In an eleventh aspect, in combination with one or more of the eighth aspect through the tenth aspect, the scan is performed based on a bootup event associated with the device.

In a twelfth aspect, in combination with one or more of the eighth aspect through the eleventh aspect, the method further includes repeating, after performing the scan based on the bootup event, the scan during operation of the device to receive one or more second scan acknowledgement messages and adjusting the length of the address field based on a second quantity of the one or more second scan acknowledgement messages.

In a thirteenth aspect, in combination with one or more of the eighth aspect through the twelfth aspect, the one or more scan acknowledgement messages include a scan acknowledgement message associated with the at least one secondary device, and the scan acknowledgement message includes a default address associated with the at least one secondary device. The default address is distinct from the logical address.

In a fourteenth aspect, in combination with one or more of the eighth aspect through the thirteenth aspect, the default address is associated with a first format, and the logical address is associated with a second format that is different than the first format.

In a fifteenth aspect, a non-transitory computer-readable medium stores instructions executable by one or more processors of a device to initiate, control, or perform operations. The operations include receiving, via an inter-integrated circuit (I2C) bus, one or more scan acknowledgement messages respectively associated with one or more secondary devices and sending, via the I2C bus, one or more address assignment messages to the one or more secondary devices. The one or more address assignment messages respectively include one or more logical addresses that are associated with the one or more secondary devices. The operations further include communicating, via the I2C bus, a data message with at least one secondary device of the one or more secondary devices. The data message includes an address field including a logical address of the one or more logical addresses, and the logical address indicates that the data message is associated with the at least one secondary device. A length of the address field is based on a quantity of the one or more scan acknowledgement messages.

In a sixteenth aspect, in combination with the fifteenth aspect, the operations further include performing a scan for the one or more secondary devices. Performing the scan includes broadcasting, via the I2C bus, a slave address registration message, and the one or more scan acknowledgement messages are received based on the slave address registration message.

In a seventeenth aspect, in combination with one or more of the fifteenth aspect through the sixteenth aspect, the operations further include terminating the scan based on detecting a termination event and, based on detecting the termination event, broadcasting, via the I2C bus, a control message indicating the length of the address field to the one or more secondary devices.

In an eighteenth aspect, in combination with one or more of the fifteenth aspect through the seventeenth aspect, the operations further include repeating, after performing the scan based on the bootup event, the scan during operation of the device to receive one or more second scan acknowledgement messages and adjusting the length of the address field based on a second quantity of the one or more second scan acknowledgement messages.

In a nineteenth aspect, in combination with one or more of the fifteenth aspect through the eighteenth aspect, the one or more scan acknowledgement messages include a scan acknowledgement message associated with the at least one secondary device, and the scan acknowledgement message includes a default address associated with the at least one secondary device. The default address is distinct from the logical address.

In a twentieth aspect, in combination with one or more of the fifteenth aspect through the nineteenth aspect, the default address is associated with a first format, and the logical address is associated with a second format that is different than the first format.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (such as application specific integrated circuits (ASICs), digital signal processors (DSP), graphics processing unit (GPU), central processing unit (CPU), computer vision processor (CVP), or neural signal processor (NSP)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to the Figures referenced above include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

One or more illustrative logics, logical blocks, modules, circuits, and operations described in connection with the implementations disclosed herein may be implemented as electronic hardware, computer software, or combinations of both. Whether such functionality is implemented in hardware or software may depend upon the particular application and design of the overall system.

In one or more aspects, the operations described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

One or more operations of a method or process disclosed herein may be implemented in a processor-executable software module which may reside on a computer-readable medium and commercially made available as a computer program product as software. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc, where disks usually reproduce data magnetically and discs reproduce data optically with lasers. Combinations of the above should also be included within the scope of computer-readable media.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward," or "left" and "right" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 5, 5, or 50 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A device comprising:
a processing system including one or more processors and one or more memories coupled to the one or more processors, the processing system configured to:
receive, via an inter-integrated circuit (I2C) bus, one or more scan acknowledgement messages respectively associated with one or more secondary devices;
send, via the I2C bus, one or more address assignment messages to the one or more secondary devices, wherein the one or more address assignment messages respectively include one or more logical addresses that are associated with the one or more secondary devices; and
communicate, via the I2C bus, a data message with at least one secondary device of the one or more secondary devices,
wherein the data message includes an address field including a logical address of the one or more logical addresses, the logical address indicating that the data message is associated with the at least one secondary device, and wherein a length of the address field is based on a quantity of the one or more scan acknowledgement messages.

2. The device of claim 1, wherein the processing system is further configured to perform a scan for the one or more secondary devices, wherein the scan includes a broadcast, via the I2C bus, of a slave address registration message, and wherein the one or more scan acknowledgement messages are received based on the slave address registration message.

3. The device of claim 2, wherein the processing system is further configured to:
terminate the scan based on detecting a termination event; and
based on the termination event, broadcast, via the I2C bus, a control message indicating the length of the address field to the one or more secondary devices.

4. The device of claim 2, wherein the scan is performed based on a bootup event associated with the device.

5. The device of claim 4, wherein the processing system is further configured to:
after the scan, repeat the scan during operation of the device to receive one or more second scan acknowledgement messages; and
adjust the length of the address field based on a second quantity of the one or more second scan acknowledgement messages.

6. The device of claim 1, wherein the one or more scan acknowledgement messages include a scan acknowledgement message associated with the at least one secondary device, and wherein the scan acknowledgement message includes a default address associated with the at least one secondary device, the default address distinct from the logical address.

7. The device of claim 6, wherein the default address is associated with a first format, and wherein the logical address is associated with a second format that is different than the first format.

8. A method of operation of a device, the method comprising:
receiving, via an inter-integrated circuit (I2C) bus, one or more scan acknowledgement messages respectively associated with one or more secondary devices;
sending, via the I2C bus, one or more address assignment messages to the one or more secondary devices, wherein the one or more address assignment messages respectively include one or more logical addresses that are associated with the one or more secondary devices; and
communicating, via the I2C bus, a data message with at least one secondary device of the one or more secondary devices,
wherein the data message includes an address field including a logical address of the one or more logical addresses, the logical address indicating that the data message is associated with the at least one secondary device, and
wherein a length of the address field is based on a quantity of the one or more scan acknowledgement messages.

9. The method of claim 8, further comprising performing a scan for the one or more secondary devices, wherein performing the scan includes broadcasting, via the I2C bus, a slave address registration message, and wherein the one or more scan acknowledgement messages are received based on the slave address registration message.

10. The method of claim 9, further comprising:
terminating the scan based on detecting a termination event; and based on detecting the termination event, broadcasting, via the I2C bus, a control message indicating the length of the address field to the one or more secondary devices.

11. The method of claim 9, wherein the scan is performed based on a bootup event associated with the device.

12. The method of claim 11, further comprising:
after performing the scan based on the bootup event, repeating the scan during operation of the device to receive one or more second scan acknowledgement messages; and
adjusting the length of the address field based on a second quantity of the one or more second scan acknowledgement messages.

13. The method of claim 8, wherein the one or more scan acknowledgement messages include a scan acknowledgement message associated with the at least one secondary device, and wherein the scan acknowledgement message includes a default address associated with the at least one secondary device, the default address distinct from the logical address.

14. The method of claim 13, wherein the default address is associated with a first format, and wherein the logical address is associated with a second format that is different than the first format.

15. A non-transitory computer-readable medium storing instructions executable by one or more processors of a device to initiate, control, or perform operations, the operations comprising:
receiving, via an inter-integrated circuit (I2C) bus, one or more scan acknowledgement messages respectively associated with one or more secondary devices;
sending, via the I2C bus, one or more address assignment messages to the one or more secondary devices, wherein the one or more address assignment messages respectively include one or more logical addresses that are associated with the one or more secondary devices; and
communicating, via the I2C bus, a data message with at least one secondary device of the one or more secondary devices,
wherein the data message includes an address field including a logical address of the one or more logical addresses, the logical address indicating that the data message is associated with the at least one secondary device, and
wherein a length of the address field is based on a quantity of the one or more scan acknowledgement messages.

16. The non-transitory computer-readable medium of claim 15, wherein the operations further comprise performing a scan for the one or more secondary devices, wherein performing the scan includes broadcasting, via the I2C bus, a slave address registration message, and wherein the one or more scan acknowledgement messages are received based on the slave address registration message.

17. The non-transitory computer-readable medium of claim 16, wherein the operations further comprise:
terminating the scan based on detecting a termination event; and
based on detecting the termination event, broadcasting, via the I2C bus, a control message indicating the length of the address field to the one or more secondary devices.

18. The non-transitory computer-readable medium of claim 16, wherein the scan is performed based on a bootup event associated with the device, and wherein the operations further comprise:

after performing the scan based on the bootup event, repeating the scan during operation of the device to receive one or more second scan acknowledgement messages; and adjusting the length of the address field based on a second quantity of the one or more second scan acknowledgement messages.

19. The non-transitory computer-readable medium of claim 15, wherein the one or more scan acknowledgement messages include a scan acknowledgement message associated with the at least one secondary device, and wherein the scan acknowledgement message includes a default address associated with the at least one secondary device, the default address distinct from the logical address.

20. The non-transitory computer-readable medium of claim 19, wherein the default address is associated with a first format, and wherein the logical address is associated with a second format that is different than the first format.

\* \* \* \* \*